US012591066B2

(12) United States Patent　　　　(10) Patent No.:　US 12,591,066 B2
Kim　　　　　　　　　　　　　　　　　(45) Date of Patent:　　Mar. 31, 2026

(54) SIGNAL PROCESSING METHOD TO AVOID DECEPTION ATTACK AND APPARATUS FOR PERFORMING THE SAME

(71) Applicant: ELECTRONICS AND TELECOMMUNICATIONS RESEARCH INSTITUTE, Daejeon (KR)

(72) Inventor: Tae Hee Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 349 days.

(21) Appl. No.: 18/205,176

(22) Filed: Jun. 2, 2023

(65) Prior Publication Data

US 2024/0103178 A1　　Mar. 28, 2024

(30) Foreign Application Priority Data

Sep. 26, 2022　　(KR) ........................ 10-2022-0121857
Mar. 27, 2023　　(KR) ........................ 10-2023-0039814

(51) Int. Cl.
　　*G01S 19/01*　　　(2010.01)
　　*G01S 19/25*　　　(2010.01)
(52) U.S. Cl.
　　CPC .......... *G01S 19/015* (2013.01); *G01S 19/254* (2013.01)
(58) Field of Classification Search
　　CPC ..... G01S 19/015; G01S 19/254; G01S 19/215
　　See application file for complete search history.

(56) References Cited

U.S. PATENT DOCUMENTS

| 6,512,803 B2 * | 1/2003 | Heinzl | ................. H04B 1/7102 |
| | | | 455/63.2 |
| 6,639,541 B1 * | 10/2003 | Quintana | ................ G01S 19/21 |
| | | | 455/226.4 |
| 6,642,884 B2 * | 11/2003 | Bryant | .................... G01S 19/25 |
| | | | 342/357.64 |

(Continued)

FOREIGN PATENT DOCUMENTS

| AU | 2006350107 A1 * | 4/2008 | ............. G01S 19/43 |
| AU | 2021100964 A4 * | 4/2021 | ........... G01S 19/215 |

(Continued)

OTHER PUBLICATIONS

GNSS Spoofing and Anti-Spoofing Technology, MDPI, Sep. 2022 (Year: 2022).*

(Continued)

*Primary Examiner* — Berhanu Tadese
(74) *Attorney, Agent, or Firm* — LRK PATENT LAW FIRM

(57)　　　　　　　　ABSTRACT

A signal processing method to avoid deception attack and apparatus for performing the same are provided. The signal processing method includes generating a synthesized signal by receiving a signal from a satellite, detecting a deception signal from the synthesized signal based on tracking information on a signal currently being tracked, separating a normal navigation signal from the synthesized signal in response to the detecting of the deception signal, and computing a normal navigation solution based on the normal navigation signal.

18 Claims, 7 Drawing Sheets

(56) References Cited

U.S. PATENT DOCUMENTS

| | | | | |
|---|---|---|---|---|
| 6,828,935 | B1 * | 12/2004 | Dunn | H01Q 3/26 |
| | | | | 342/383 |
| 6,842,498 | B2 * | 1/2005 | Heinzl | H03J 3/08 |
| | | | | 455/227 |
| 6,931,055 | B1 * | 8/2005 | Underbrink | H04B 1/707 |
| | | | | 375/150 |
| 6,952,440 | B1 * | 10/2005 | Underbrink | H04B 1/7077 |
| | | | | 375/150 |
| 7,372,400 | B2 * | 5/2008 | Cohen | H04K 3/90 |
| | | | | 342/357.29 |
| 7,623,068 | B2 * | 11/2009 | Powell | G01S 19/21 |
| | | | | 342/357.29 |
| 7,822,105 | B2 * | 10/2010 | Underbrink | G06F 9/544 |
| | | | | 375/150 |
| 7,969,354 | B2 * | 6/2011 | Levin | G01S 19/08 |
| | | | | 342/357.58 |
| 8,068,054 | B2 * | 11/2011 | Levin | G01S 19/29 |
| | | | | 342/357.46 |
| 8,134,911 | B2 * | 3/2012 | Yang | H04L 27/2675 |
| | | | | 370/503 |
| 8,138,972 | B2 * | 3/2012 | Underbrink | H04B 1/707 |
| | | | | 342/357.63 |
| 8,593,345 | B2 * | 11/2013 | Underbrink | G01S 19/24 |
| | | | | 342/357.72 |
| 8,896,479 | B2 * | 11/2014 | Wang | G01S 19/21 |
| | | | | 342/16 |
| 9,020,697 | B2 * | 4/2015 | Ricci | A61B 5/4809 |
| | | | | 701/36 |
| 9,123,186 | B2 * | 9/2015 | Ricci | G06Q 30/0265 |
| 9,235,941 | B2 * | 1/2016 | Ricci | G06F 30/398 |
| 9,290,153 | B2 * | 3/2016 | Ricci | B60R 25/102 |
| 9,366,762 | B2 * | 6/2016 | Smith | G01S 19/215 |
| 9,383,449 | B2 * | 7/2016 | Kim | G01S 19/215 |
| 9,658,340 | B2 * | 5/2017 | Shin | G01S 19/21 |
| 9,755,730 | B2 * | 9/2017 | Ryu | H04B 7/18517 |
| 9,778,367 | B2 * | 10/2017 | Wang | G01S 19/21 |
| 9,883,209 | B2 * | 1/2018 | Ricci | G08B 21/0205 |
| 9,958,549 | B2 * | 5/2018 | Psiaki | H04K 3/65 |
| 10,162,061 | B2 * | 12/2018 | Kim | G01S 19/215 |
| 10,365,376 | B2 * | 7/2019 | Lee | G01S 1/04 |
| 10,775,510 | B2 * | 9/2020 | Agee | G01S 19/215 |
| 10,983,221 | B2 * | 4/2021 | Agee | G01S 19/215 |
| 10,996,339 | B2 * | 5/2021 | Agee | G01S 19/215 |
| 11,119,221 | B2 * | 9/2021 | Cohen | G01S 19/06 |
| 11,258,625 | B2 * | 2/2022 | Decenzo | G05D 1/46 |
| 11,391,599 | B1 * | 7/2022 | Anvari | H04W 56/001 |
| 11,500,109 | B2 * | 11/2022 | Kaabouch | G01S 19/215 |
| 11,626,971 | B2 * | 4/2023 | Curran | H04L 9/008 |
| | | | | 380/255 |
| 11,662,474 | B2 * | 5/2023 | Gick | G01S 19/215 |
| | | | | 342/357.59 |
| 12,222,426 | B2 * | 2/2025 | Di Grazia | G01S 19/215 |
| 12,292,516 | B2 * | 5/2025 | Schmidt Diaz | G01S 19/215 |
| 2009/0195354 | A1 * | 8/2009 | Levin | G01S 19/21 |
| | | | | 340/5.8 |
| 2011/0006946 | A1 * | 1/2011 | Yu | G01S 19/30 |
| | | | | 342/357.69 |
| 2011/0068973 | A1 * | 3/2011 | Humphreys | G01S 19/215 |
| | | | | 342/357.29 |
| 2012/0086597 | A1 * | 4/2012 | Sin | G01S 19/21 |
| | | | | 342/357.23 |
| 2012/0092214 | A1 * | 4/2012 | Lee | G01S 19/21 |
| | | | | 342/357.77 |
| 2014/0002303 | A1 * | 1/2014 | Sin | G01S 19/27 |
| | | | | 342/357.59 |
| 2014/0049787 | A1 * | 2/2014 | Jacob | G06T 11/60 |
| | | | | 358/1.6 |
| 2014/0085137 | A1 * | 3/2014 | Sin | H04W 64/00 |
| | | | | 342/385 |
| 2014/0309886 | A1 * | 10/2014 | Ricci | G06Q 20/308 |
| | | | | 701/41 |
| 2014/0310594 | A1 * | 10/2014 | Ricci | G05D 1/0016 |
| | | | | 715/702 |
| 2014/0310610 | A1 * | 10/2014 | Ricci | G06Q 30/0645 |
| | | | | 715/744 |
| 2015/0035702 | A1 * | 2/2015 | Joo | G01S 19/21 |
| | | | | 342/357.59 |
| 2015/0116148 | A1 * | 4/2015 | Kim | G01S 19/215 |
| | | | | 342/357.59 |
| 2015/0123846 | A1 * | 5/2015 | Jeong | G01S 19/215 |
| | | | | 342/357.59 |
| 2016/0116597 | A1 * | 4/2016 | Jeong | G01S 19/215 |
| | | | | 342/357.58 |
| 2016/0205419 | A1 * | 7/2016 | Ricci | G08B 21/18 |
| | | | | 725/75 |
| 2016/0223678 | A1 * | 8/2016 | Kim | G01S 19/215 |
| 2017/0075701 | A1 * | 3/2017 | Ricci | G08G 1/096805 |
| 2021/0286088 | A1 * | 9/2021 | Cheng | G01S 19/52 |
| 2021/0382179 | A1 * | 12/2021 | Cohen | G01S 19/06 |
| 2023/0137969 | A1 * | 5/2023 | Kim | G01S 19/29 |
| | | | | 342/357.59 |
| 2023/0318849 | A1 * | 10/2023 | Jung | H04L 63/123 |
| | | | | 713/170 |
| 2024/0103178 | A1 * | 3/2024 | Kim | G01S 19/215 |
| 2024/0264315 | A1 * | 8/2024 | Joo | G04R 20/02 |

FOREIGN PATENT DOCUMENTS

| | | | | | |
|---|---|---|---|---|---|
| CA | 2628795 | A1 * | 4/2008 | | G01S 19/43 |
| CA | 2628795 | C * | 1/2014 | | G01S 19/43 |
| CA | 2940652 | A1 * | 9/2015 | | G01S 19/29 |
| CA | 2940652 | C * | 7/2022 | | G01S 19/48 |
| CN | 101379410 | B * | 2/2013 | | G01S 19/46 |
| CN | 104656104 | A * | 5/2015 | | G01S 19/21 |
| CN | 105717518 | A * | 6/2016 | | G01S 19/215 |
| CN | 104155663 | B * | 1/2017 | | G01S 19/215 |
| CN | 106470901 | A * | 3/2017 | | G01S 19/29 |
| CN | 104656104 | B * | 6/2017 | | G01S 19/21 |
| CN | 110244323 | A * | 9/2019 | | G01S 19/015 |
| CN | 110308464 | A * | 10/2019 | | G01S 19/215 |
| CN | 106470901 | B * | 12/2019 | | G01S 19/43 |
| CN | 111427070 | A * | 7/2020 | | G01S 19/22 |
| CN | 112147646 | A * | 12/2020 | | G01S 19/215 |
| CN | 110231633 | B * | 5/2021 | | G01S 19/21 |
| CN | 113031019 | A * | 6/2021 | | G01S 19/215 |
| CN | 113031020 | B * | 3/2022 | | G01S 19/215 |
| CN | 113031021 | B * | 3/2022 | | G01S 19/215 |
| CN | 114646981 | A * | 6/2022 | | G01S 19/215 |
| CN | 115291256 | A * | 11/2022 | | G01S 19/215 |
| CN | 115327579 | A * | 11/2022 | | G01S 19/215 |
| CN | 115407368 | A * | 11/2022 | | G01S 19/215 |
| CN | 111427070 | B * | 3/2023 | | G01S 19/22 |
| CN | 110308464 | B * | 7/2023 | | G01S 19/215 |
| CN | 116430414 | A * | 7/2023 | | G01S 19/215 |
| CN | 116430414 | B * | 11/2023 | | G01S 19/215 |
| CN | 114325769 | B * | 6/2024 | | |
| CN | 115088273 | B * | 2/2025 | | H04W 4/44 |
| CN | 114648047 | B * | 4/2025 | | G06F 18/214 |
| CN | 120050596 | A * | 5/2025 | | H04W 4/44 |
| CN | 120050597 | A * | 5/2025 | | H04W 4/44 |
| EP | 0921409 | B1 * | 3/2005 | | G01S 19/32 |
| EP | 1955090 | B1 * | 8/2009 | | H04K 3/255 |
| EP | 2455781 | A1 * | 5/2012 | | G01S 19/36 |
| EP | 2708917 | A1 * | 3/2014 | | G01S 19/215 |
| EP | 2796896 | B1 * | 8/2016 | | G01S 19/24 |
| EP | 3056925 | A1 * | 8/2016 | | G01S 19/015 |
| EP | 2455781 | B1 * | 5/2017 | | G01S 19/36 |
| EP | 3056925 | B1 * | 3/2018 | | G01S 19/215 |
| EP | 3671281 | A1 * | 6/2020 | | H04L 63/0442 |
| FR | 2995700 | A1 * | 3/2014 | | G01S 19/015 |
| FR | 3032805 | A1 * | 8/2016 | | G01S 19/015 |
| FR | 3032805 | B1 * | 10/2019 | | G01S 19/215 |
| JP | 2008058320 | A * | 3/2008 | | H04B 1/707 |
| JP | 2010169683 | A * | 8/2010 | | G01S 19/30 |
| JP | 2019045150 | A * | 3/2019 | | |
| KR | 20050017564 | A * | 2/2005 | | G01S 19/11 |
| KR | 20070012308 | A * | 1/2007 | | G01S 19/37 |
| KR | 20130135739 | A * | 12/2013 | | G01S 19/015 |
| KR | 20140049787 | A * | 4/2014 | | G01S 19/215 |
| KR | 101484861 | B1 * | 1/2015 | | G01S 19/21 |
| KR | 101498613 | B1 * | 3/2015 | | G01S 19/01 |

(56) References Cited

FOREIGN PATENT DOCUMENTS

| | | | | | | |
|----|----|----|----|----|----|----|
| KR | 20150050114 | A | * | 5/2015 | ............ | G01S 19/20 |
| KR | 20150050617 | A | * | 5/2015 | ............ | G01S 19/21 |
| KR | 20180066666 | A | * | 6/2016 | .......... | G01S 19/015 |
| KR | 10-2016-0094728 | A | | 8/2016 | | |
| KR | 20160094728 | A | * | 8/2016 | ............ | G01S 5/011 |
| KR | 20170057966 | A | * | 5/2017 | .......... | G01S 19/015 |
| KR | 101775516 | B1 | * | 9/2017 | .......... | H01Q 21/061 |
| KR | 20170124224 | A | * | 11/2017 | ............ | G01S 19/39 |
| KR | 20180063398 | A | * | 6/2018 | .......... | G01S 19/015 |
| KR | 20180099191 | A | * | 9/2018 | .......... | G01S 19/015 |
| KR | 20190041208 | A | * | 4/2019 | .......... | G01S 19/015 |
| KR | 20190068861 | A | * | 6/2019 | .......... | G01S 19/015 |
| KR | 102042104 | B1 | * | 11/2019 | .......... | G01S 19/215 |
| KR | 20200107143 | A | * | 9/2020 | .......... | G01S 19/015 |
| KR | 10-2258696 | B1 | | 6/2021 | | |
| KR | 20220081697 | A | * | 6/2022 | .......... | G01S 19/015 |
| KR | 20220135584 | A | * | 10/2022 | ............ | H01Q 21/06 |
| KR | 102465550 | B1 | * | 11/2022 | .......... | G08G 5/0069 |
| KR | 20230002326 | A | * | 1/2023 | ........ | H04L 63/1425 |
| KR | 20230063853 | A | * | 5/2023 | .......... | G01S 19/015 |
| KR | 20240043049 | A | * | 4/2024 | ............ | G01S 19/24 |
| WO | WO-0177705 | A2 | * | 10/2001 | ................ | H03J 3/08 |
| WO | WO-0186318 | A1 | * | 11/2001 | .......... | G01S 19/252 |
| WO | WO-0204977 | A2 | * | 1/2002 | ............ | G01S 19/09 |
| WO | WO-02059639 | A1 | * | 8/2002 | ............ | G01S 19/25 |
| WO | WO-2005047923 | A2 | * | 5/2005 | ............ | G01S 19/34 |
| WO | WO-2008024534 | A2 | * | 2/2008 | ............ | G01S 19/20 |
| WO | WO-2008048283 | A2 | * | 4/2008 | ............ | G01S 19/11 |
| WO | WO-2012105752 | A2 | * | 8/2012 | ............ | H04K 3/46 |
| WO | WO-2014047378 | A1 | * | 3/2014 | ............ | H04K 3/22 |
| WO | WO-2018014980 | A1 | * | 1/2018 | ............ | G01S 19/29 |
| WO | WO-2020144679 | A1 | * | 7/2020 | .......... | G01S 19/215 |
| WO | WO-2022165150 | A1 | * | 8/2022 | .......... | G01S 19/215 |
| WO | WO-2025125183 | A1 | * | 6/2025 | .......... | G01S 19/215 |

OTHER PUBLICATIONS

Jamming and Spoofing Detection in GNSS, Sensors, Jun. 28, 2024 (Year: 2024).*

M. Psiaki et al. GPS Spoofing Detection via Dual-Receiver Correlation of Military Signals, IEEE Transactions on Aerospace and Electronic Systems, 2013 (Year: 2013).*

Taro Suzuki, Signal Tracking, Aug. 2022, Retrieved from https-gnss-learning.org (Year: 2022).*

E. Schmidt, N. Gatsis and D. Akopian, "A GPS Spoofing Detection and Classification Correlator-Based Technique Using the Lasso," in IEEE Transactions on Aerospace and Electronic Systems, vol. 56, No. 6, pp. 4224-4237, Dec. 2020, (Year: 2020).*

A. Cavaleri, B. Motella, M. Pini and M. Fantino, "Detection of spoofed GPS signals at code and carrier tracking level," 2010 5th ESA Workshop on Satellite Navigation Technologies and European Workshop on GNSS Signals and Signal Processing (NAVITEC), Noordwijk, Netherlands, 2010, pp. 1-6, (Year: 2010).*

M. L. Psiaki, B. W. O'Hanlon, J. A. Bhatti, D. P. Shepard and T. E. Humphreys, "GPS Spoofing Detection via Dual-Receiver Correlation of Military Signals," in IEEE Transactions on Aerospace and Electronic Systems, vol. 49, No. 4, pp. 2250-2267, Oct. 2013, (Year: 2013).*

Sherman Lo et al., "Signal Authentication : A Secure Civil GNSS for Today", InsideGNSS, Sep.-Oct. 2009.

* cited by examiner

200

Receiver 210

230 RF-BB converter

250 Signal processor

SIGNAL PROCESSING METHOD TO AVOID DECEPTION ATTACK AND APPARATUS FOR PERFORMING THE SAME

CROSS-REFERENCE TO RELATED APPLICATIONS

This application claims the benefit of Korean Patent Application No. 10-2022-0121857 filed on Sep. 26, 2022 and 10-2023-0039814 filed on Mar. 27, 2023, in the Korean Intellectual Property Office, the entire disclosures of which are incorporated herein by reference for all purposes.

BACKGROUND

1. Field of the Invention

One or more embodiments relate to a signal processing method to avoid a deception attack and an apparatus for performing the same.

2. Description of Related Art

A satellite navigation system using a global positioning system (GPS) is being used throughout the industry. While the use of the satellite navigation system increases, a malicious attempt to disturb the satellite navigation system (e.g., a deception attack) is occurring.

An example of a deception attack to disturb the satellite navigation system includes Iran's deceptive attacking and landing a U.S. drone and a successful experiment in hijacking a ship several kilometers away at sea using a deception signal at the University of Texas, U.S. There is also a case of a ship being moved to land by a deliberate deception signal near the Black Sea in Russia. A deception attack that may cause serious damage may also occur in the future. The types of deception attack include a type in which the location of the receiver of an attack target is continuously deceived to move the attack target in a desired direction or location and a type in which the location of a receiver passing through a specific area is disturbed by sending a fixed deception signal for the specific area.

An existing receiver does not provide a method of detecting a deception signal and tracking a normal navigation signal again in the case of a deception attack. When a receiver continuously tracks a signal and continuously calculates a navigation solution based on the tracked signal, the receiver considers this to be a normal operation.

To minimize damage from a deception attack, it is important to monitor a signal currently being tracked, detect and avoid a deception signal, and track a normal navigation signal as quickly as possible.

SUMMARY

Embodiments provide technology of detecting a deception signal and avoiding the deception signal while continuously monitoring a signal currently being tracked.

Embodiments provide technology of separating a normal navigation signal from a synthesized signal in which the normal navigation signal is combined with a deception signal, tracking the normal navigation signal, and computing a normal navigation solution, when a deception attack occurs.

However, the technical aspects are not limited to the aforementioned aspects, and other technical aspects may be present.

According to an aspect, there is provided a signal processing method to avoid a deception attack, the method including generating a synthesized signal by receiving a signal from a satellite, detecting a deception signal from the synthesized signal based on tracking information on a signal currently being tracked, separating a normal navigation signal from the synthesized signal in response to the detecting of the deception signal, and computing a normal navigation solution based on the normal navigation signal.

The tracking information may include a code location and Doppler information of the signal currently being tracked.

The detecting of the deception signal may include calculating signal intensity correlation values of signals included in the synthesized signal and determining whether the deception signal is included in the synthesized signal based on the signal intensity correlation values.

The calculating of the signal intensity correlation values may include calculating the signal intensity correlation values of the signals included in the synthesized signal within a predetermined code location range, based on a code location of the signal currently being tracked.

The determining of whether the deception signal is included in the synthesized signal may include determining, as the deception signal, a signal which has a signal intensity correlation value greater than a signal intensity correlation value of the signal currently being tracked among the signals included in the synthesized signal.

The determining of whether the deception signal is included in the synthesized signal may further include setting a deception detect flag to a first state when the deception signal is included in the synthesized signal and setting the deception detect flag to a second state when there is no signal which has a signal intensity correlation value greater than a signal intensity correlation value of the signal currently being tracked among the signals included in the synthesized signal.

The signal processing method to avoid a deception attack may further include detecting the deception signal again in response to the deception detect flag being in the second state.

The separating of the normal navigation signal may include determining whether the normal navigation signal is separated from the synthesized signal and generating tracking information on the normal navigation signal when the normal navigation signal is determined to have been separated from the synthesized signal.

The determining of whether the normal navigation signal is separated may include determining whether a distribution of signal intensity correlation values of the normal navigation signal maintains a predetermined shape and determining whether the normal navigation signal is separated.

The distribution of the signal intensity correlation values of the normal navigation signal may include a distribution of Early-Prompt-Late correlation values.

According to another aspect, there is provided an apparatus for signal processing to avoid a deception attack, the apparatus including a converter configured to generate a synthesized signal by receiving a signal from a satellite and a signal processor configured to detect a deception signal from the synthesized signal based on tracking information on a signal currently being tracked, separate a normal navigation signal from the synthesized signal, and generate a normal navigation solution based on the normal navigation signal.

The tracking information may include a code location and Doppler information of the signal currently being tracked.

The signal processor may be configured to calculate signal intensity correlation values of signals included in the synthesized signal and determine whether the deception signal is included in the synthesized signal based on the signal intensity correlation values.

The signal processor may be configured to calculate the signal intensity correlation values of the signals included in the synthesized signal within a predetermined code location range, based on a code location of the signal currently being tracked.

The signal processor may be configured to determine, as the deception signal, a signal which has a signal intensity correlation value greater than a signal intensity correlation value of the signal currently being tracked among the signals included in the synthesized signal.

The signal processor may be configured to set a deception detect flag to a first state when the deception signal is included in the synthesized signal and set the deception detect flag to a second state when there is no signal which has a signal intensity correlation value greater than a signal intensity correlation value of the signal currently being tracked among the signals included in the synthesized signal.

The signal processor may be configured to detect the deception signal again in response to the deception detect flag being in the second state.

The signal processor may be configured to determine whether the normal navigation signal is separated from the synthesized signal and generate tracking information on the normal navigation signal when the normal navigation signal is determined to have been separated from the synthesized signal.

The signal processor may be configured to determine whether a distribution of signal intensity correlation values of the normal navigation signal maintains a predetermined shape and determine whether the normal navigation signal is separated.

The distribution of the signal intensity correlation values of the normal navigation signal may include a distribution of Early-Prompt-Late correlation values.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
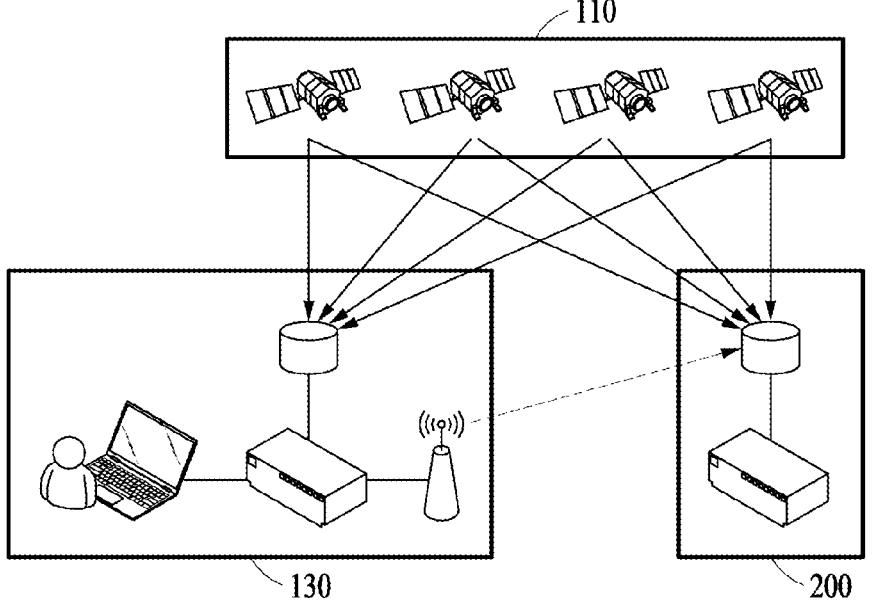
FIG. 1 is a diagram illustrating a satellite navigation system according to an embodiment.

The following structural or functional descriptions of embodiments described herein are merely intended for the purpose of describing the embodiments described herein and may be implemented in various forms. Thus, actual form of implementation is not limited to the embodiments described herein, and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, and similarly, the second component may be referred to as the first component within the scope of the present disclosure.

When it is mentioned that one component is "connected" to another component, it may be understood that the one component is directly connected or coupled to another component or still another component is interposed between the two components.

As used herein, the singular forms "a," "an," and "the" are intended to include the plural forms as well, unless the context clearly indicates otherwise. As used herein, "A or B," "at least one of A and B," "at least one of A or B," "A, B, or C," "at least one of A, B, and C," and "at least one of A, B, or C," each of which may include any one of the items listed together in the corresponding one of the phrases, or all possible combinations thereof. It will be further understood that the terms "include," "comprise," and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

The term "module" used in this document may include a unit implemented in hardware, software, or firmware, and may be used interchangeably with terms such as logic, logic block, component, or circuit. A module may be an integrally constructed component or a minimal unit of the component or part thereof that performs at least one function. For example, according to an embodiment, the module may be implemented as an application-specific integrated circuit (ASIC).

The term "unit" used in this document may refer to software or a hardware component such as a field programmable gate array (FPGA) or an ASIC, and "unit" may perform predetermined roles. However, "unit" is not limited to software or hardware. "Unit" may be configured to be in an addressable storage and may be configured to operate at least one processor. For example, "unit" may include components such as software components, object-oriented software components, class components, and task components, processes, functions, properties, procedures, subroutines, segments of program code, drivers, firmware, microcode, circuitry, data, database, data structures, tables, arrays, and variables. A function provided within the components and "units" may be combined with a smaller number of components and "units" or further divided into additional components and "units." In addition, the components and "units" may also be implemented to operate at least one central processing unit (CPU) in a device or a secure multimedia card. In addition, "unit" may include at least one processor.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a diagram illustrating a satellite navigation system according to an embodiment.

Referring to FIG. 1, according to an embodiment, the satellite navigation system may include a satellite 110 and an apparatus 200 (e.g., a deception attack avoiding apparatus). The satellite navigation system may further include a deception source 130 (e.g., a spoofer). There may be at least one satellite 110. The apparatus 200 may be implemented in a terminal and/or a communication apparatus (e.g., a transmitting apparatus, a receiving apparatus, etc.).

The apparatus 200 may receive a signal (e.g., a normal navigation signal) transmitted by the satellite 110 through a receiver included in the apparatus 200, generate location information from the received signal, and compute a navigation solution based on the generated location information. The apparatus 200 may be a target of a deception attack of the deception source 130. The deception source 130 may receive the same signal as the apparatus 200 receives from the satellite 110 to maintain synchronization with the receiver. The deception source 130 may generate and transmit a deception signal that is synchronized with the normal navigation signal in order to perform the deception attack.

The apparatus 200 may receive the deception signal transmitted by the deception source 130. The apparatus 200 may receive the deception signal as a signal in which the deception signal is combined with the signal received from the satellite 110 (e.g., a synthesized signal). The apparatus 200 may perform a signal processing method to avoid a deception attack.

Figure 2:
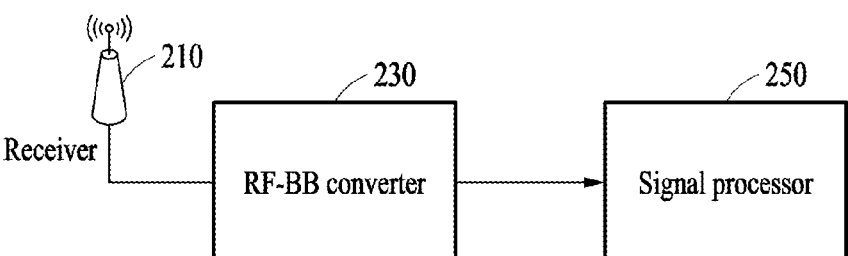
FIG. 2 is a block diagram of a deception attack avoiding apparatus according to an embodiment.

FIG. 2 is a block diagram of a deception attack avoiding apparatus according to an embodiment.

Referring to FIG. 2, according to an embodiment, the apparatus 200 may perform the signal processing method to avoid a deception attack. The apparatus 200 may include a receiver 210, a radio frequency-baseband (RF-BB) converter 230, and a signal processor 250. The receiver 210 may receive a signal from a satellite (e.g., the satellite 110 of FIG. 1). For example, the signal received from the satellite 110 may be a signal of the radio frequency (RF) band, that is, an RF signal. Here, the receiver 210 may also receive a deception signal from a deception source (e.g., the deception source 130 of FIG. 1).

The RF-BB converter 230 may convert the RF signal received from the satellite 110 into a signal of the baseband frequency band, that is, a baseband signal. The RF-BB converter 230 may output the baseband signal to the signal processor 250. For example, the baseband signal may include a deception signal.

The signal processor 250 may perform the signal processing method to avoid a deception attack based on the baseband signal obtained as a result of the conversion by the RF-BB converter 230. For example, the signal processor 250 may detect a deception signal from the baseband signal, separate a normal navigation signal from the baseband signal, and compute a normal navigation solution based on the normal navigation signal.

Figure 3:
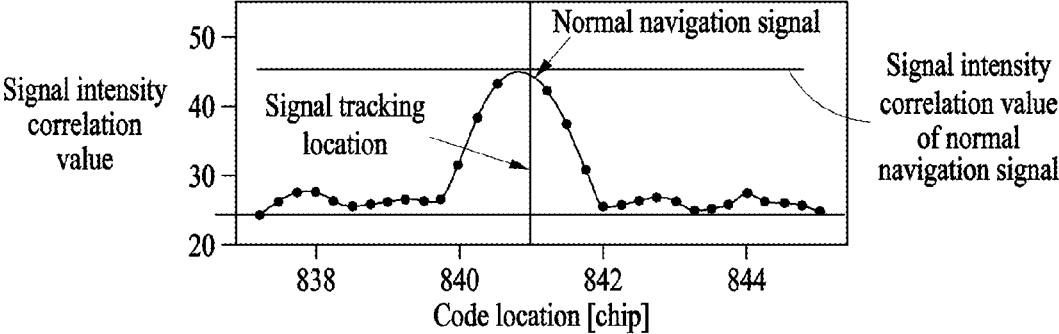
FIG. 3 is a diagram illustrating an example of signal tracking of the deception attack avoiding apparatus illustrated in FIG. 2.

FIG. 3 is a diagram illustrating an example of signal tracking of the deception attack avoiding apparatus illustrated in FIG. 2.

FIG. 3 assumes that a deception attack on the apparatus 200 has not occurred yet or that the deception attack does not affect the apparatus 200. That is, FIG. 3 illustrates an operation in which the apparatus 200 receives only a normal navigation signal and tracks a code location of the normal navigation signal.

Referring to FIG. 3, the apparatus 200 may track a signal (e.g., the normal navigation signal) based on a received signal. When the deception attack on the apparatus 200 has not occurred yet or the deception attack does not affect the apparatus 200, the apparatus 200 may receive only the normal navigation signal. The apparatus 200 may calculate a correlation value of the received signal to track the signal. The correlation value may be a value calculated by the apparatus 200 using a known value and a correlation equation to interpret the received signal. The apparatus 200 may perform a signal tracking process using the correlation value (e.g., the calculated correlation value). For example, the apparatus 200 may operate a frequency-locked loop (FLL) and a code tracking loop.

The apparatus 200 may track the code location of a signal having the largest correlation value based on the correlation value. The apparatus 200 may generate a pseudo range using code location information of the normal navigation signal. The apparatus 200 may compute a normal navigation solution using the pseudo range. When the deception attack does not affect the apparatus 200, the apparatus 200 may navigate normally.

Figure 4:
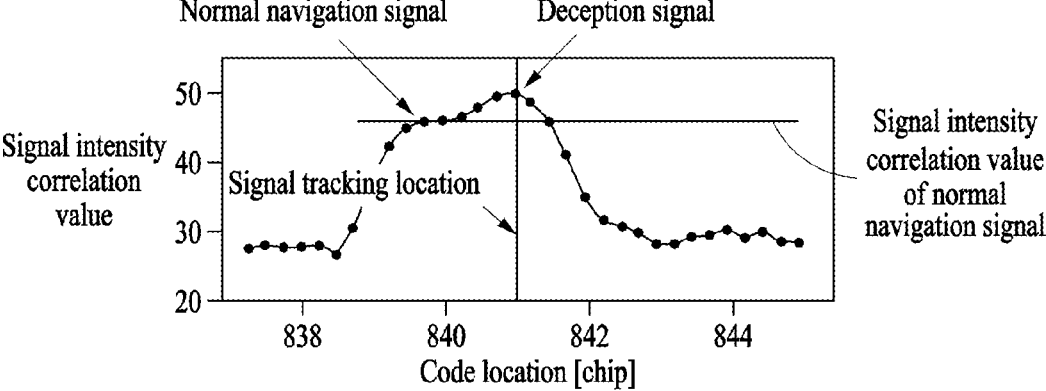
FIG. 4 is a diagram illustrating another example of signal tracking of the deception attack avoiding apparatus illustrated in FIG. 2.

FIG. 4 is a diagram illustrating another example of signal tracking of the deception attack avoiding apparatus illustrated in FIG. 2. FIG. 4 assumes that the apparatus 200 may be affected by a deception attack. That is, FIG. 4 illustrates an operation in which the apparatus 200 may detect a deception signal and tracks the deception signal due to the influence of the deception attack.

Referring to FIG. 4, when the deception signal is transmitted, the apparatus 200 may generate a signal (e.g., a synthesized signal) in which the deception signal is combined with a normal navigation signal. As described with reference to FIG. 3, the apparatus 200 may calculate the correlation values (e.g., signal intensity correlation values) of signals included in the synthesized signal and use the correlation value for tracking the signals in the synthesized signal.

The deception signal may have greater signal intensity than the normal navigation signal and thus may have a greater calculated correlation value than the normal navigation signal. A signal tracking location of the apparatus 200 may be gradually moved from the code location of the normal navigation signal to the code location of a signal having a greater signal intensity correlation value (e.g., the deception signal) than the normal navigation signal. When the deception signal is combined within a predetermined range (e.g., "M" chip. Here, "M" may be "1.0.") from the code location of the normal navigation signal, the signal tracking location of the apparatus 200 may completely be moved to the code location of the deception signal.

When the signal tracking location of the apparatus 200 is completely moved to the code location of the deception signal, the apparatus 200 may compute a wrong navigation solution based on information (e.g., location and time) of the deception signal being tracked and move to the location the deception source 130 intended.

The apparatus 200 may detect the deception signal from the synthesized signal, separate the normal navigation signal from the synthesized signal, and compute a normal navigation solution based on the normal navigation signal. The apparatus 200 may not move to the location the deception source 130 intended by detecting the deception signal and avoiding the deception attack.

Figure 5:
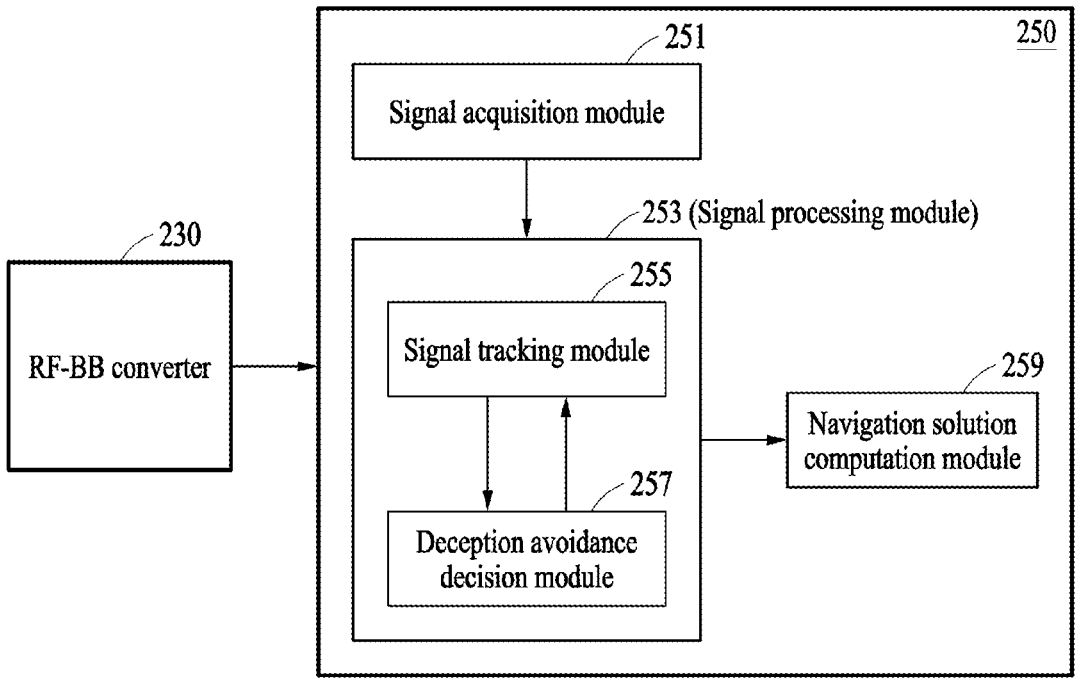
FIG. 5 is a block diagram of a signal processor illustrated in FIG. 2.

FIG. 5 is a block diagram of the signal processor 250 illustrated in FIG. 2.

Referring to FIG. 5, the signal processor 250 may include a signal acquisition module 251, a signal processing module 253, and a navigation solution computation module 259. The signal processing module 253 may include a signal tracking module 255 and a deception avoidance decision module 257.

The signal acquisition module 251 may receive a synthesized signal output from the RF-BB converter 230. The signal acquisition module 251 may generate a code location and Doppler information for the synthesized signal and output the code location and the Doppler information to the signal processing module 253. The code location and the Doppler information may be used in the signal tracking module 255 and the deception avoidance decision module 257.

The signal tracking module 255 may track a signal using the code location and the Doppler information. The signal tracking module 255 may calculate a pseudo range and generate navigation data (e.g., bit information), based on the synthesized signal. The signal tracking module 255 may output the pseudo range and the navigation data to the navigation solution computation module 259.

The deception avoidance decision module 257 may obtain tracking information of a signal currently being tracked (e.g., the code location and Doppler information of the signal currently being tracked) from the signal tracking module 255. The deception avoidance decision module 257 may periodically determine whether there are other signals around the code location of the signal currently being tracked by the signal tracking module 255, based on the tracking information. When there is a signal that is not currently being tracked within a predetermined range (e.g., "M" chip. Here, "M" may be "1.0.") from the code location of the signal currently being tracked, the deception avoidance decision module 257 may determine and detect the corresponding signal (e.g., the signal not currently being tracked) to be a deception signal.

The deception avoidance decision module 257 may make a decision to avoid the deception signal when the deception signal is detected. When it is determined that the normal navigation signal may be separated from the synthesized signal and that the signal tracking module 255 may track the normal navigation signal again, the deception avoidance decision module 257 may decide it may be possible to avoid the deception signal.

The navigation solution computation module 259 may compute a normal navigation solution using navigation data and the pseudo range. The apparatus 200 may navigate based on the normal navigation solution.

Figure 6:
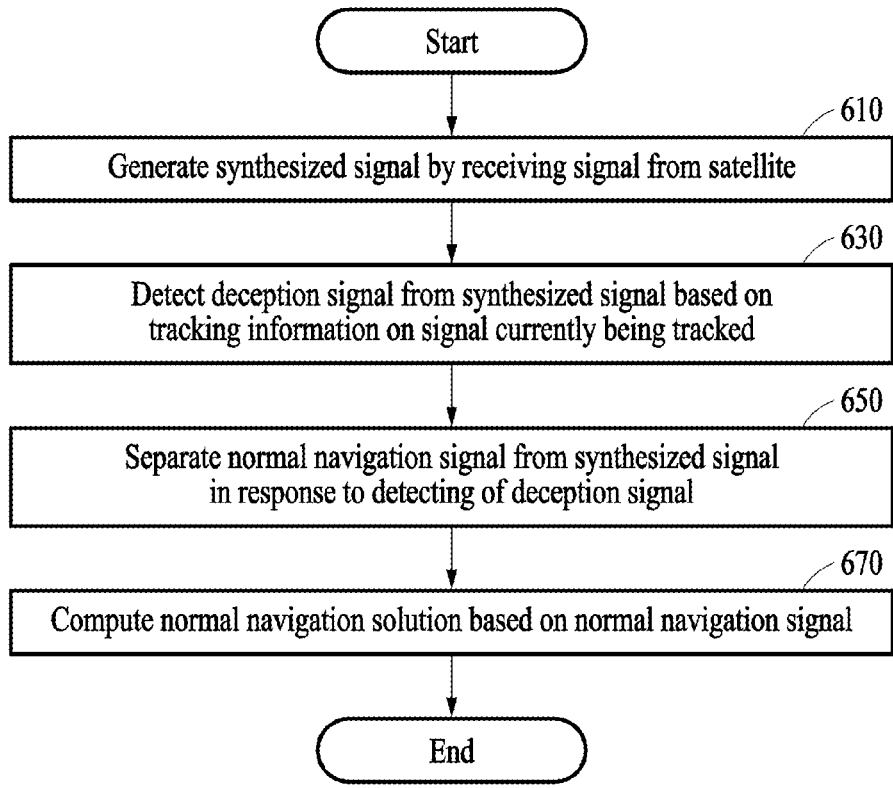
FIG. 6 is a flowchart illustrating an example of a signal processing method to avoid a deception attack according to an embodiment.

FIG. 6 is a flowchart illustrating an example of a signal processing method to avoid a deception attack according to an embodiment.

Operations 610 to 670 may be substantially the same as those of the signal processing method performed by the apparatus (e.g., the apparatus 200 of FIG. 1) described with reference to FIGS. 1 to 5.

In operation 610, the apparatus 200 may generate a synthesized signal (e.g., a signal in which a deception signal is combined with a normal navigation signal) by receiving a signal from a satellite (e.g., the satellite 110 of FIG. 1).

In operation 630, the apparatus 200 may detect the deception signal from the synthesized signal based on tracking information on a signal currently being tracked (e.g., a code location and Doppler information of the signal currently being tracked).

In operation 650, the apparatus 200 may separate the normal navigation signal from the synthesized signal in response to the detecting of the deception signal.

In operation 670, the apparatus 200 may compute a normal navigation solution based on the normal navigation signal.

Operations 610 to 670 may be performed sequentially but are not limited thereto. For example, at least two operations may be performed in parallel.

Figure 7:
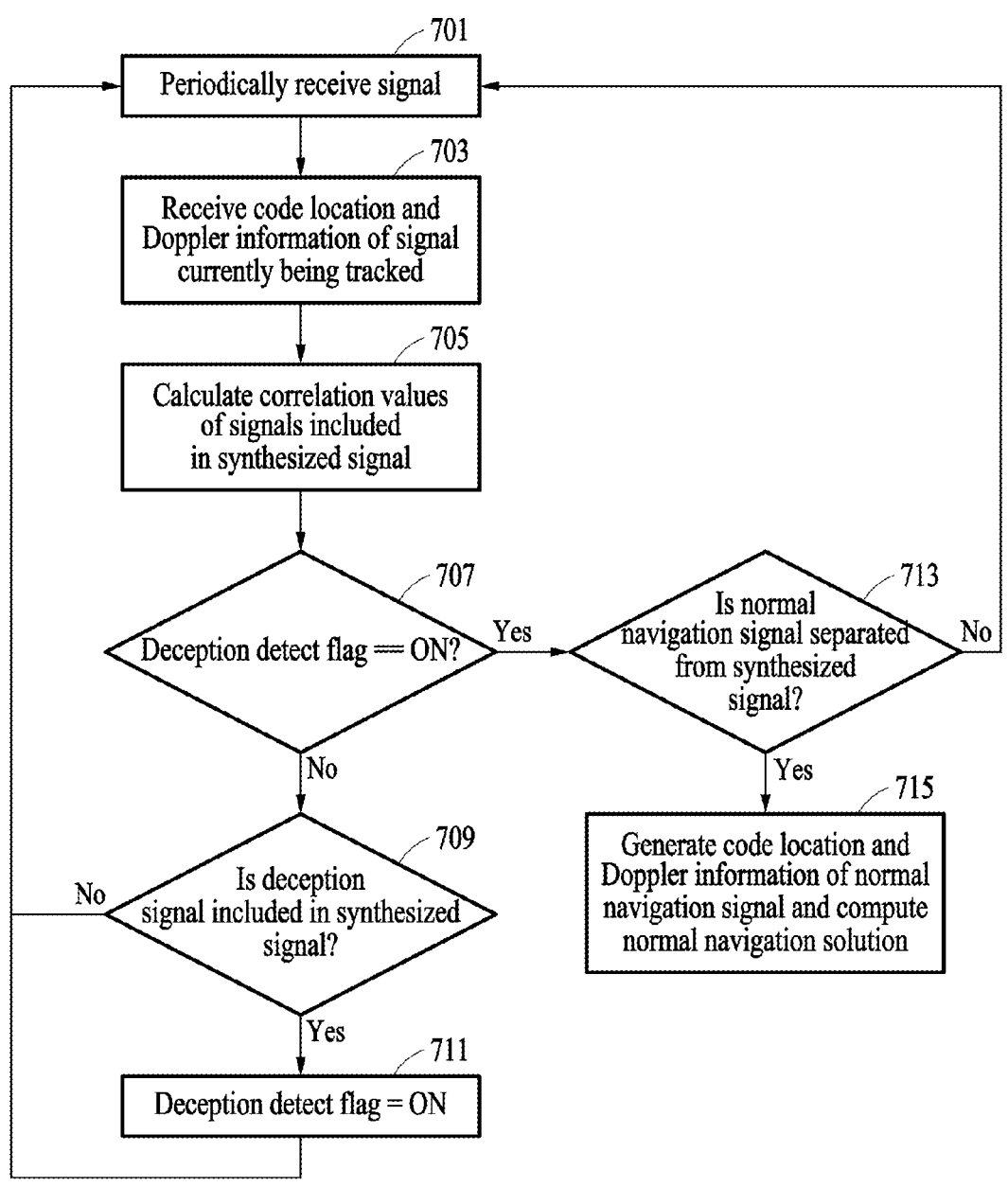
FIG. 7 is a flowchart illustrating another example of a signal processing method to avoid a deception attack according to an embodiment.

FIG. 7 is a flowchart illustrating another example of a signal processing method to avoid a deception attack according to an embodiment.

FIG. 7 may be a flowchart specifically illustrating the process in which the apparatus 200 detects a deception signal, separates a normal navigation signal to avoid the detected deception signal, and tracks the normal navigation signal again.

In operation 701, the signal tracking module 255 and the deception avoidance decision module 257 may periodically receive a signal (e.g., a synthesized signal) from the RF-BB converter 230. Periods in which the signal tracking module 255 and the deception avoidance decision module 257 receive signals from the RF-BB converter 230 may be different from each other. For example, the signal tracking module 255 may receive the signal from the RF-BB converter 230 in real time, while the deception avoidance decision module 257 may receive the signal in a period of "N" seconds (e.g., "N" may be a real number equal to or greater than "1.").

In operation 703, the deception avoidance decision module 257 may receive, from the signal tracking module 255, a code location and Doppler information of a signal currently being tracked by the signal tracking module 255 among signals included in the synthesized signal.

In operation 705, the deception avoidance decision module 257 may calculate correlation values of the signals included in the synthesized signal. The deception avoidance decision module 257 may calculate the correlation values based on the code location and Doppler information of the signal currently being tracked. The deception avoidance decision module 257 may calculate the correlation values within a predetermined code location range (e.g., within ±"N" chip. Here, "N" may be "5.") from the code location of the signal currently being tracked. The correlation values may include a correlation value of signal intensity and an Early-Prompt-Late correlation value. The Early-Prompt-Late correlation value may be used in operation 713.

In operation 707, the deception avoidance decision module 257 may determine whether a deception detect flag is in a first state (e.g., ON). The deception detect flag may be a flag representing whether the deception signal included in the synthesized signal is detected. When the deception detect flag is not in an ON state (e.g., when in an OFF state), the deception avoidance decision module 257 may perform operation 709. When the deception detect flag is in the ON state, the deception avoidance decision module 257 may perform operation 713.

In operation 709, the deception avoidance decision module 257 may determine whether the deception signal is included in the synthesized signal. The deception avoidance decision module 257 may determine whether the deception signal is included in the synthesized signal using the correlation values (e.g., the correlation values calculated in operation 705). The deception avoidance decision module 257 may use the characteristic that the signal intensity correlation value of the deception signal is greater than the signal intensity correlation value of the normal navigation signal. The deception avoidance decision module 257 may determine a signal having a greater correlation value than the signal currently being tracked as the deception signal and may determine that the deception signal is included in the synthesized signal. The deception avoidance decision module 257 may perform operation 711 when it is determined that the deception signal is included in the synthesized signal. The deception avoidance decision module 257 may perform operations 701 to 707 again to detect the deception signal when it is determined that the deception signal is not included in the synthesized signal.

In operation 711, the deception avoidance decision module 257 may set the deception detect flag to the ON state.

In operation 713, the deception avoidance decision module 257 may determine whether the normal navigation signal is separated from the synthesized signal. Determining whether the normal navigation signal is separated from the synthesized signal may be for determining whether a condition to avoid the deception signal is satisfied. Determining whether the normal navigation signal is separated from the synthesized signal may be based on the Early-Prompt-Late correlation value calculated in operation 705. The deception avoidance decision module 257 may determine whether the normal navigation signal is separated from the synthesized signal by determining whether the distribution of Early-Prompt-Late correlation values of the normal navigation signal maintains a predetermined shape (e.g., a triangle shape), for example, as the distribution of correlation values 810 of FIG. 8. Determining whether the normal navigation signal is separated therefrom may be for determining whether a condition to track the normal navigation signal is satisfied. The deception avoidance decision module 257 may perform operation 715 when it is determined that the normal navigation signal is separated from the synthesized signal. The deception avoidance decision module 257 may perform operations 701 to 707 again until the normal navigation signal is separated from the synthesized signal when it is determined that the normal navigation signal is not separated from the synthesized signal.

In operation 715, the deception avoidance decision module 257 may generate the code location and Doppler information of the normal navigation signal. The deception avoidance decision module 257 may transmit the generated code location and Doppler information of the normal navigation signal to the signal tracking module 255. The signal tracking module 255 may track the normal navigation signal using the received code location and Doppler information of the normal navigation signal. The signal tracking module 255 may calculate the pseudo range of the normal navigation signal, extract bit information of the normal navigation signal, and transmit the calculated pseudo range and the extracted bit information to the navigation solution computation module 259. The navigation solution computation module 259 may compute the normal navigation solution based on the calculated pseudo range and the extracted bit information of the normal navigation signal.

Figure 8:
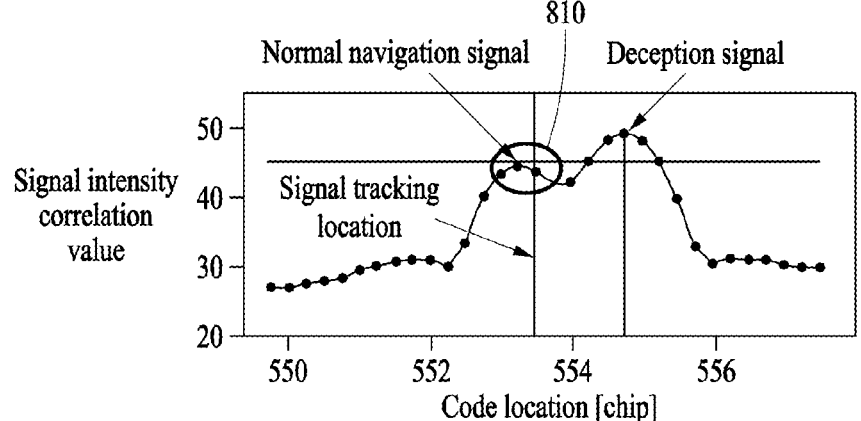
FIG. 8 is a diagram illustrating an example of separating a normal navigation signal from a synthesized signal according to an embodiment.

FIG. 8 is a diagram illustrating an example of separating a normal navigation signal from a synthesized signal according to an embodiment. FIG. 8 illustrates an example of the distribution shape of Early-Prompt-Late correlation values of the normal navigation signal that may be used to determine whether the normal navigation signal is separated therefrom as described in operation 713 of FIG. 7.

The deception avoidance decision module 257 may calculate correlation values of signals included in the synthesized signal (e.g., operation 705 of FIG. 7) to determine whether the normal navigation signal is separated therefrom, in order to avoid a deception signal. The deception avoidance decision module 257 may determine whether the distribution of correlation values on the left and right of the Prompt (e.g., an early correlation value and a late correlation value) maintains a predetermined shape (e.g., a triangle shape) at the code location of the largest correlation value (e.g., a prompt location) among code locations of the normal navigation signal. When the distribution of the three of the Early-Prompt-Late correlation values maintains the triangle shape, it may be determined that the normal navigation signal may be separated from the synthesized signal. A shape 810 of FIG. 8 may be an example of the distribution shape of the correlation values of the normal navigation signal that may be separated from the synthesized signal.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using hardware components, software components, or a combination thereof. For example, a device, a method, and a component described in the examples may be implemented using one or more general-purpose or special-purpose computers, such as, for example, a processor, a controller, an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of the processing device is used as singular. However, one skilled in the art will appreciate that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and/or data may be stored in any type of machine, component, physical or virtual equipment, or computer storage medium or device, capable of providing instructions or data to or being interpreted by the processing device. The software may also be distributed over network coupled computer systems so that the software is stored and executed in a distributed fashion. The software and data may be stored by one or more non-transitory computer readable recording media.

The method according to the above-described embodiments may be recorded in non-transitory computer-readable media including program instructions to implement various operations which may be performed by a computer. The media may also include the program instructions, data files, data structures, and the like alone or in combination. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and higher-level code that may be executed by the computer using an interpreter.

The above-described hardware devices may be configured to act as one or more software modules in order to perform the operations of the above-described embodiments, or vice versa.

While this disclosure includes embodiments illustrated with reference to limited drawings, it will be apparent to one of ordinary skill in the art that various changes in form and details may be made in these embodiments without departing from the spirit and scope of the claims and their equivalents. Descriptions of features or aspects in each embodiment are to be considered as being applicable to similar features or aspects in other embodiments. Suitable results may be achieved if the described techniques are performed in a different order, and/or if components in a described system, architecture, device, or circuit are coupled or combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A signal processing method to avoid a deception attack, the method comprising:
    generating a synthesized signal by receiving a signal from a satellite;
    detecting a deception signal from the synthesized signal based on tracking information on a signal currently being tracked;
    separating a normal navigation signal from the synthesized signal in response to the detecting of the deception signal; and
    computing a normal navigation solution based on the normal navigation signal,
    wherein the separating of the normal navigation signal comprises:

determining whether the normal navigation signal is separated from the synthesized signal; and
    generating tracking information on the normal navigation signal when the normal navigation signal is determined to have been separated from the synthesized signal.

2. The method of claim 1, wherein the tracking information comprises a code location and Doppler information of the signal currently being tracked.

3. The method of claim 1, wherein the detecting of the deception signal comprises:
    calculating signal intensity correlation values of signals included in the synthesized signal; and
    determining whether the deception signal is included in the synthesized signal based on the signal intensity correlation values.

4. The method of claim 3, wherein the calculating of the signal intensity correlation values comprises calculating the signal intensity correlation values of the signals included in the synthesized signal within a predetermined code location range, based on a code location of the signal currently being tracked.

5. The method of claim 3, wherein the determining of whether the deception signal is included in the synthesized signal comprises determining, as the deception signal, a signal which has a signal intensity correlation value greater than a signal intensity correlation value of the signal currently being tracked among the signals included in the synthesized signal.

6. The method of claim 4, wherein the determining of whether the deception signal is included in the synthesized signal further comprises:
    setting a deception detect flag to a first state when the deception signal is included in the synthesized signal; and
    setting the deception detect flag to a second state when there is no signal which has a signal intensity correlation value greater than a signal intensity correlation value of the signal currently being tracked among the signals included in the synthesized signal.

7. The method of claim 6, further comprising detecting the deception signal again in response to the deception detect flag being in the second state.

8. The method of claim 1, wherein the determining of whether the normal navigation signal is separated comprises determining whether a distribution of signal intensity correlation values of the normal navigation signal maintains a predetermined shape and determining whether the normal navigation signal is separated.

9. The method of claim 8, wherein the distribution of the signal intensity correlation values of the normal navigation signal comprises a distribution of Early-Prompt-Late correlation values.

10. An apparatus for signal processing to avoid a deception attack, the apparatus comprising:
    a converter configured to generate a synthesized signal by receiving a signal from a satellite; and
    a signal processor configured to detect a deception signal from the synthesized signal based on tracking information on a signal currently being tracked, separate a normal navigation signal from the synthesized signal, and generate a normal navigation solution based on the normal navigation signal,
    wherein when separating the normal navigation signal, the signal processor is configured to:
    determine whether the normal navigation signal is separated from the synthesized signal; and generate tracking information on the normal navigation signal when the normal navigation signal is determined to have been separated from the synthesized signal.

11. The apparatus of claim 10, wherein the tracking information comprises a code location and Doppler information of the signal currently being tracked.

12. The apparatus of claim 10, wherein the signal processor is configured to:

calculate signal intensity correlation values of signals included in the synthesized signal; and determine whether the deception signal is included in the synthesized signal based on the signal intensity correlation values.

13. The apparatus of claim 12, wherein the signal processor is configured to calculate the signal intensity correlation values of the signals included in the synthesized signal within a predetermined code location range, based on a code location of the signal currently being tracked.

14. The apparatus of claim 12, wherein the signal processor is configured to determine, as the deception signal, a signal which has a signal intensity correlation value greater than a signal intensity correlation value of the signal currently being tracked among the signals included in the synthesized signal.

15. The apparatus of claim 13, wherein the signal processor is configured to:

set a deception detect flag to a first state when the deception signal is included in the synthesized signal; and set the deception detect flag to a second state when there is no signal which has a signal intensity correlation value greater than a signal intensity correlation value of the signal currently being tracked among the signals included in the synthesized signal.

16. The apparatus of claim 15, wherein the signal processor is configured to detect the deception signal again in response to the deception detect flag being in the second state.

17. The apparatus of claim 10, wherein the signal processor is configured to determine whether a distribution of signal intensity correlation values of the normal navigation signal maintains a predetermined shape and determine whether the normal navigation signal is separated.

18. The apparatus of claim 17, wherein the distribution of the signal intensity correlation values of the normal navigation signal comprises a distribution of Early-Prompt-Late correlation values.

\* \* \* \* \*